United States Patent
Voss et al.

(10) Patent No.: US 6,511,077 B1
(45) Date of Patent: Jan. 28, 2003

(54) CLAMPING CHUCK FOR CLAMPING TOOLS BY SHRINKAGE

(75) Inventors: Michael Voss, Leonberg (DE); Hans-Ruediger Steudte, Denkendorf (DE)

(73) Assignee: Bilz Werkzeugfabrik GmbH & Co. KG, Ostfildern (DE)

( * ) Notice: Subject to any disclaimer, the term of this patent is extended or adjusted under 35 U.S.C. 154(b) by 131 days.

(21) Appl. No.: 09/723,214

(22) Filed: Nov. 27, 2000

(30) Foreign Application Priority Data

Nov. 30, 1999 (DE) .......................... 199 58 832

(51) Int. Cl.$^7$ .................... B23B 31/117; B23P 11/02
(52) U.S. Cl. ...................... 279/102; 29/447; 403/30; 403/273; 407/34
(58) Field of Search .................. 279/102, 158; 29/447, 446, 450, 515; 403/273, 28–30, 278, 279, 282; 407/34, 53, 54

(56) References Cited

U.S. PATENT DOCUMENTS

| | | | |
|---|---|---|---|
| 5,277,435 A | * 1/1994 | Kramer et al. | 29/447 |
| 5,311,654 A | 5/1994 | Cook | |
| 6,234,729 B1 | * 5/2001 | Cook | 29/447 |
| 6,260,858 B1 | * 7/2001 | Delucia | 279/102 |
| 6,312,201 B1 | * 11/2001 | Nagaya et al. | 409/234 |
| 6,339,868 B1 | * 1/2002 | Nagaya et al. | 29/447 |
| 6,340,274 B1 | * 1/2002 | Shimomura et al. | 407/34 |
| 6,394,466 B1 | * 5/2002 | Matsumoto et al. | 29/447 |

FOREIGN PATENT DOCUMENTS

| | | | | |
|---|---|---|---|---|
| EP | 0 382 079 B1 | 8/1993 | | |
| JP | 2001129728 A | * 5/2001 | | B23P/11/02 |
| WO | 00/71286 A1 | 11/2000 | | |

OTHER PUBLICATIONS

Patent Abstract of Japan vol. 012, No. 208 (M–709), Jun. 15, 1988 & JP 63 011242 A, Jan. 18, 1988.

* cited by examiner

*Primary Examiner*—Steven C. Bishop
(74) *Attorney, Agent, or Firm*—Michael J. Striker

(57) ABSTRACT

A clamping chuck for clamping tools by shrinkage has a chuck body provided with a receptacle for receiving a tool to be clamped with a tool shaft and having an end-side abutment surface for the insertable tool so that during insertion a rear-side shoulder of the tool axially abuts against the abutment surface and a ring element and axially supportable against the chuck body in an axial direction and provided with an abutment surface, the abutment surface of the ring element being located forwardly at an end axially adjoining the abutment surface of the chuck body, to be associated with the shoulder of the tool, for axial clamping of the inserted tool by means of the ring element with respect to the chuck body.

18 Claims, 1 Drawing Sheet

CLAMPING CHUCK FOR CLAMPING TOOLS BY SHRINKAGE

BACKGROUND OF THE INVENTION

The present invention relates to clamping chuck for clamping tools by shrinkage.

A clamping chuck of this type is disclosed for example in U.S. Pat. No. 5,311,654 and in the European patent document no. EP 382 079. The clamping chuck disclosed in the prior art provide a clamping of tools by shrinkage, and an additionally for a radial clamping in the region of the tool shaft for providing a tool transmission, needs an axial support, for example an axial plane abutment on the clamping chuck. This is the case for example for special types of mills, drills or similar tools, for example having a specially designed milling cutting heads. They are provided at the rear side of the tool head with a shoulder which is suitable for an axial abutment. In known clamping chucks of this type such a rear side planar abutment is however available only during the joining process performed in heated condition. During cooling the chuck body shrinks however not only radially but also axially, so that a rear side shoulder of the tool has no planar abutment and an axial support. Therefore after a predetermined use, disadvantages are developed, for example inadequate rigidity of the chuck body with clamped-in tool, low concentric accuracy of the tool, susceptibility to vibrations, and relatively low service life of the tool.

SUMMARY OF THE INVENTION

Accordingly, it is an object of the present invention to provide a clamping chuck of the above mentioned general type, which avoids the disadvantages of the prior art.

More particularly, it is an object of the present invention to provide a clamping chuck of the above mentioned general type which guarantees a reliable planar abutment of the tool on the chuck body.

In keeping with these objects and with others which will become apparent hereinafter, one feature of present invention resides, briefly stated, in a clamping chuck in which the chuck body on its open end of the receptacle has an end-side abutment surface for the inserted tool, during insertion with a rear-side shoulder it can abut against the abutment surface, and in the region of an end portion which carries the abutment surface a ring element is arranged which in an axial direction is axially supportable on the chuck body, and forwardly on the end which axially adjoins the abutment surface, an abutment surface which is associated with the shoulder of the tool is provided for axial clamping of the inserted tool by means of the ring element relative to the chuck body.

Thereby it is possible, by means of the ring element to provide an axial clamping of the inserted tool so that the tool with its rear-side shoulder abuts against the associated abutment surface of the ring element which is axially clamped between the chuck body and the tool.

In this manner a reliable plane abutment for the tool against the chuck body is provided, whereby the strength of the chuck body together with the inserted tool is increased, the concentricity of the tool is improved, the sensitivity to vibration of the system is reduced, and finally the service life of the tool is substantially improved.

As for the ring element, the invention proceeds from the presumption that it can be advantageously a shrink ring.

However, instead, it can be loaded in another manner, for example mechanically, so that the ring element is first inoperative during insertion of the tool and abutment of the same with the rear-side shoulder against the abutment surface of the chuck body, and is then actuated, when by cooling and shrinkage the longitudinal portion of the chuck body radially clamps the tool shaft in the receptacle. Due to the axial shrinkage of the longitudinal portion an axial gap between the rear-side shoulder of the tool and the end-side abutment surface of the clamping chuck is provided. Then the ring element is activated. For example by corresponding loading with mechanical forces it is moved to the inward-side shoulder of the tool until the ring element abuts with its abutment surface against the rear-side shoulder of the tool, and the tool is axially clamped in this way.

It is especially advantageous when this movement of the ring element with its design as the shrink ring is performed by corresponding truncated cone surfaces of the chuck body on the one hand and the ring element on the other hand, which narrows to the end of the chuck body or in other words to its abutment surface or to the abutment surface of the ring element. The clamping chuck in accordance with the present invention is simple, light and cost favorable. It is composed of two components, namely a one-piece chuck body on the one hand and the ring element on the other hand.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
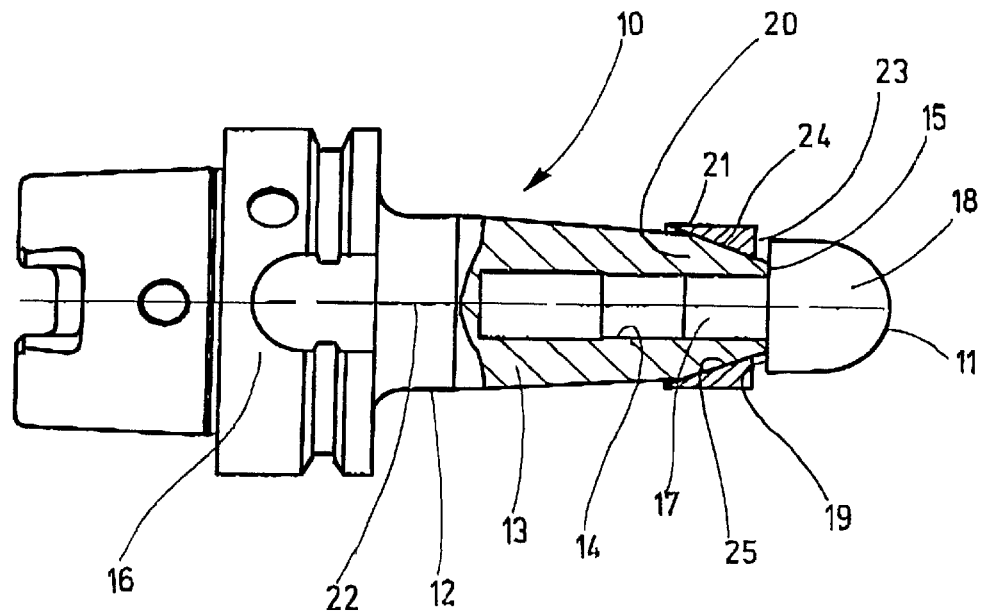
FIG. 1 is a schematic side view with a partial axial longitudinal section of a clamping chuck in accordance with the present invention, with an inserted tool in a phase during a clamping process by shrinkage.
Figure 2:
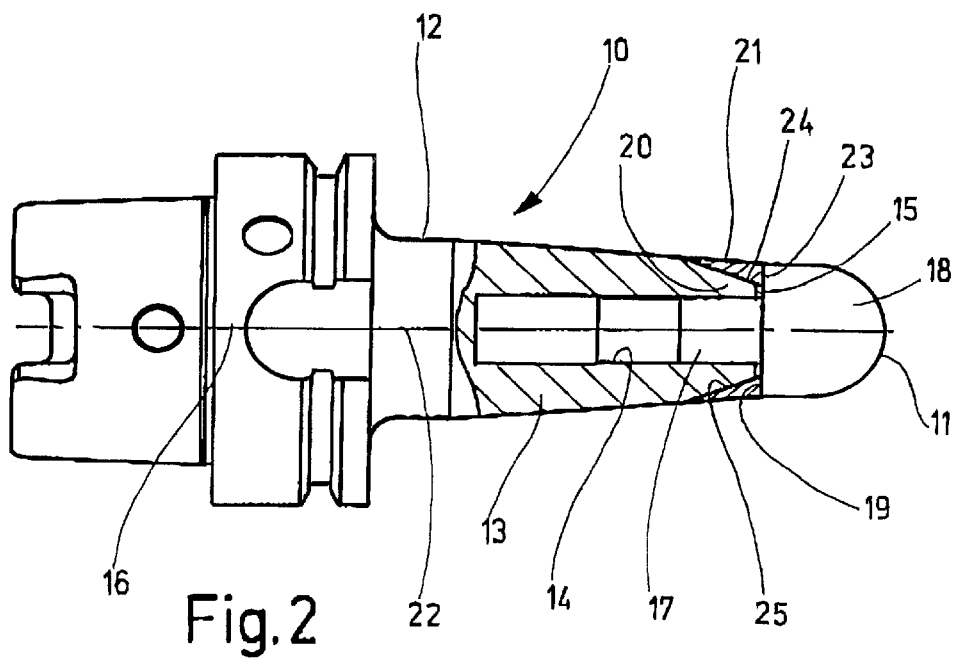
FIG. 2 is a schematic side view with a partial axial longitudinal section of the clamping chuck of FIG. 1, in the final clamping condition.

FIGS. 1 and 2 show a clamping chuck 10 for clamping of tools 11 by shrinking, in a schematic way. The clamping chuck 10 has a chuck body 12. The chuck body has a longitudinal portion 13 with a central receptacle 14 which is open to the right end in the drawing. The right end is provided with an end-side abutment surface 15. The chuck body 12 finally has an end region 16 which adjoins the longitudinal portion 13. It is not important for the present invention and can be designed in any way.

The clamping chuck 10 is insertable with the end region 16, in particular the one-piece chuck body 12, for example into a working spindle of a power tool as known in the art. The entry region 16, contrary to the shown construction, can be designed in a different way, depending on the particulars of the receptacle or clamping for the chuck body 12. The end region 16 can be designed for example as a simple shaft which is a part of a clamping chuck. Alternatively, it can be insertable with the chuck body 12 into a clamping chuck, which is received in the working spindle of a power tool.

The inner receptacle 14 which extends to the plane abutment surface 15 serves for insertion and receiving of the tool 11 to be clamped in the clamping chuck 12 together with its cylindrical shaft 17. The tool 11 can be of any construction. It is composed for example of a mill or a drill. In both cases the cylindrical shaft 17 has a relatively small axial length. The tool 11, and the location where it merges into the shaft 17 in the tool body 18, has a rear-side axial shoulder 19. During insertion into the receptacle 14 the tool 11 can axially abut with the shoulder 19 against the abutment surface 15, as shown in FIG. 1.

The clamping chuck 12 has a one-piece construction. In the region of an end portion 20 of the chuck body 12 which is located at the right side in FIGS. 1 and 2, in particular the longitudinal portion 13, a ring element 21 is provided as a second component of the clamping chuck 10. The ring element 21 can be axially supported in an axial direction, and in particular in FIGS. 1 and 2 in the axial direction facing to the left, against a chuck body 12 and particularly its end portion 20. Forwardly at the end side which axially adjoins the abutment surface 15, the ring element 21 has a plane abutment surface 23. The abutment surface 23 similarly to the abutment surface 15 extends perpendicular to the axis 22 of the chuck body 12.

The abutment surface 23 is associated with the shoulder 19 of the tool 11 and serves for axially clamping the corresponding tool 11 shown in FIG. 1, by means of the ring element 21 relative to the chuck body 12. This condition is shown in FIG. 2. The end portion 20 of the chuck body 12 has a truncated cone surface 24, which narrows forwardly toward the abutment surface 15 and serves for an axial abutment of the ring element 21. The ring element 21 also has.a truncated cone surface 25 which extends in FIGS. 1 and 2 to the left to the end portion 20 or narrows to the abutment surface 23. It serves for an axial abutment of the ring element 11 against the chuck body 12, for example for rear-side support.

The truncated cone surface 24 of the end portion 20 and the truncated cone surface 25 of the ring element 21 have the same angle. This angle is greater than the self-locking angle. It can be seen that the angle of the truncated cone surfaces 24, 25 is however very shallow. This angle is selected so that a movement of the ring element 21 along the truncated cone surface 24 of the end portion 20 is carried over axially. The angle of the corresponding truncated cone surface 24, 25 amounts for example to 10–20° in particular approximately to 15°.

As can be seen from FIGS. 1 and 2, the truncated cone surface 25 of the ring element 21 extends axially from its abutment surface 23 to its another axial end. The truncated cone surface 24 of the end portion 25 of the chuck body 12 extends axially to the abutment surface 15. The ring element 21 sits with its truncated cone surface 25 on the truncated cone surface 24 of the end portion 20 of the chuck body 12.

The ring element 21 is formed as a ring which is increasable and reducible, in particular expandable and narrowable. This is especially advantageous for shrinking. The ring element 21 is composed of a material with a higher thermal expansion coefficient than that of the material, from which at least the longitudinal portion 13 of the chuck body 12 with the receptacle 14 is formed. The ring element 21 is composed advantageously for example of aluminum. Also, austenitic steel can be used for the ring element 21. At least the longitudinal portion 13 of the chuck body 12 which contains the receptacle 14 is composed of steel, for example hot work steel.

The arrangement for the clamping chuck 10 is selected so that during warming up for performing the shrinkage mounting of the tool 11, the ring element 21 is expanded radially more than the longitudinal portion 17. Therefore the ring element 21, because of the inner truncated cone surface 25, moves along the truncated cone surface of the end portion 20 axially rearwardly, and with its abutment surface 23 away from the abutment surface 15. The tool 11 which is brought to this stage can abut with the rear-side shoulder 19 against the abutment surface 15 and limit the insertion depth of the shaft 17 in the receptacle 14. In this phase, as shown in FIG. 1, the tool 11 abuts with its shoulder 19 against the end-side abutment surface 15 of the chuck body 12.

During subsequent cooling, for example of the part of the longitudinal part 13 which is free from the ring element 21, the longitudinal portion 13 shrinks with the radial clamping of the shaft 17 in the receptacle 14, so that the shrinkage mounting of the tool 11 is held radially and also axially firmly on the chuck body 12, in particular the longitudinal portion 13. During cooling, the chuck body 12, in particular its longitudinal portion 13 contracts also in an axial direction. This leads to the situation that a gap between the abutment 15 and the shoulder 19 of the tool 11 is produced, which is shown in FIG. 2 for better illustration with substantially large sizes, while actually it has significantly smaller axial dimensions. Because of this gap, no axial abutment of the shoulder 19 of the tool 11 against the chuck body 12. Thereby no reliable plane abutment in this region is produced, which however is required from reasons of strength, in addition to a radial clamping for the purpose of torque transmission.

With the inventive clamping chuck, despite the above described axial gap, reliable plane abutment of the tool 11 is provided, so that during cooling of the ring element 21, with shrinkage with its truncated cone surface 25 along the truncated cone surface 24 of the end portion 20, it travels axially forwardly, until the ring element 21 is pressed with its abutment surface 23 against the shoulder 19 of the clamped tool 11 with an axial pretensioning. The ring element 21 clamps axially between the longitudinal portion 13, in particular the end portion 20 of the chuck body 12 on the one hand, and the tool 11 on the other hand. Thereby with the cooled down tool 11 and the cooled down chuck body 12, a reliable plane abutment of the tool 11 with its shoulder 19 against the chuck body 12 is produced.

Thereby the strength of the arrangement body 12/tool 11 is increased, the vibration sensitivity is reduced, and thereby the service life of the tool 11 is considerably improved. It is further advantageous that the ring element 21 in a certain way can operate as an axial buffer between the tool 11 and the chuck body 12. The material of the ring element 21 has good damping properties, so that the ring element 21 can simultaneously operate as a damper.

It will be understood that each of the elements described above, or two or more together, may also find a useful application in other types of constructions differing from the types described above.

While the invention has been illustrated and described as embodied in clamping chuck for clamping tools by shrinkage, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A clamping chuck for clamping tools by shrinkage, comprising a chuck body having a longitudinal portion with a receptacle open at one end for insertion and receiving a tool to be clamped with a tool shaft, said chuck body at an open end of said receptacle having an end-side abutment surface for the insertable tool so that during insertion a rear-side shoulder of the tool axially abuts against said abutment surface; wherein said longitudinal portion of said chuck body having an end portion with a truncated cone surface which narrows forwardly toward said abutment surface of said chuck body and supporting a ring element, said ring element being axially supportable against said chuck body in one axial direction and being provided with an abutment surface, said abutment surface of said ring element being located forwardly at an end which is axially adjoining said abutment surface of said chuck body so as to be associated with the shoulder of the tool, for axial clamping of the inserted tool by means of said ring element with respect to said chuck body, wherein said ring element is formed so that during heating of said ring element it expands radially more than said longitudinal portion of said chuck body, and is movable along said truncated cone surface of said end portion of said chuck body axially rearwardly and with said abutment surface of said ring element away from said abutment surface of said chuck body for an axial abutment of an inserted tool.

2. A clamping chuck as defined in claim 1, wherein said ring element has a truncated cone surface which expands toward said end portion of said chuck body for axial abutment against said truncated cone surface of said chuck body.

3. A clamping chuck as defined in claim 2, wherein said truncated cone surface of said end portion of said chuck body and said truncated cone surface of said ring element have a same angle, said angle being greater than a self locking angle.

4. A clamping chuck as defined in claim 3, wherein an angle of a corresponding one of said truncated cone surfaces is selected so that a movement of said ring element along said truncated cone surface of said end portion of said chuck body is a transmission axially.

5. A clamping chuck as defined in claim 3, wherein a respective one of said truncated cone surfaces has an angle substantially between 10° and 20°.

6. A clamping chuck as defined in claim 5, wherein said angle amounts to substantially 15°.

7. A clamping chuck as defined in claim 3, wherein said truncated cone surface of said ring element extends axially from said abutment surface of said ring element to an opposite axial end.

8. A clamping chuck as defined in claim 2, wherein said truncated cone surface of said end portion of said chuck body extends axially to said abutment surface of said chuck body.

9. A clamping chuck as defined in claim 3, wherein said ring element with said truncated cone surface of said ring element is seated on said truncated cone surface of said end portion of said chuck body.

10. A clamping chuck as defined in claim 1, wherein said ring element is formed as a ring which increases and reduces at least in a radial direction.

11. A clamping chuck as defined in claim 11, wherein said ring expands and narrows.

12. A clamping chuck as defined in claim 1, wherein said ring element is formed as a shrinkage ring.

13. A clamping chuck as defined in claim 1, wherein said ring is composed of a material with a higher thermal expansion coefficient than that of said longitudinal portion of said chuck body which is provided with said receptacle.

14. A clamping chuck as defined in claim 1, wherein said ring element is composed of aluminum.

15. A clamping chuck as defined in claim 1, wherein said ring element is composed of austenitic steel.

16. A clamping chuck as defined In claim 1, wherein at least said longitudinal portion of said chuck body which has said receptacle is composed of steel.

17. A clamping chuck as defined in claim 1, wherein said ring element is formed so that during cooling of a part of said longitudinal portion of said chuck body which is free from said ring element, said longitudinal portion of said chuck body is first shrunk with radial clamping of a tool shaft in said receptacle, and said ring element during shrinkage is movable along said truncated cone surface of said end portion of said chuck body axially forwardly with its abutment surface against said shoulder of said inserted tool.

18. A clamping chuck for clamping tools by shrinkage, comprising a chuck body having a longitudinal portion with a receptacle open at one end for insertion and receiving a tool to be clamped with a tool shaft, said chuck body at an open end of said receptacle having an end-side abutment surface for the insertable tool so that during insertion a rear-side shoulder of the tool axially abuts against said abutment surface; and a ring element arranged in a region of an end portion of said chuck body which carries said abutment surface, said ring element being axially supportable against said chuck body in one axial direction and being provided with an abutment surface, said abutment surface of said ring element being located forwardly at an end which is axially adjoining said abutment surface of said chuck body so as to be associated with the shoulder of the tool, for axial clamping of the inserted tool by means of said ring element with respect to said chuck body, wherein said ring element is formed so that during heating of said ring element it expands radially more than said longitudinal portion of said chuck body, and is movable along said truncated cone surface of said end portion of said chuck body axially rearwardly and with said abutment portion of said ring element away from said abutment surface of said chuck body for an axial abutment of an inserted tool.

* * * * *